Jan. 1, 1952    D. A. NALLY    2,580,577
WINDSHIELD WIPER BALANCER
Filed Nov. 15, 1946    2 SHEETS—SHEET 1
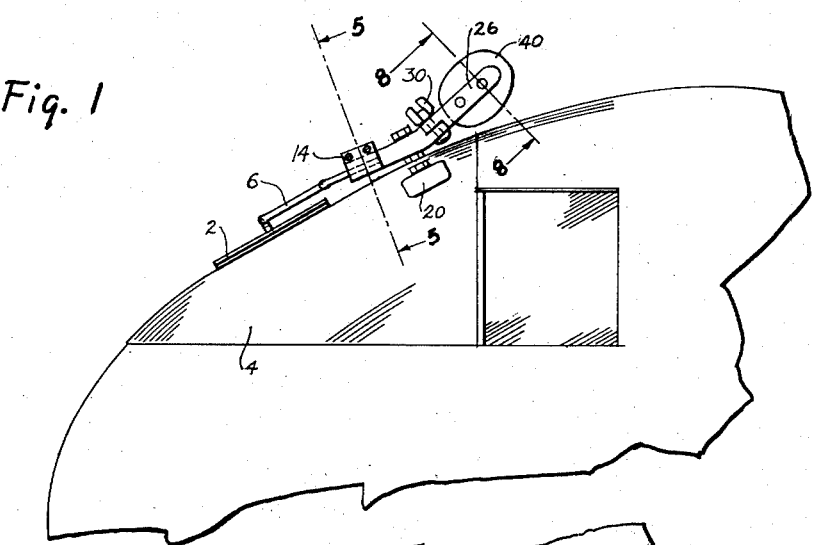
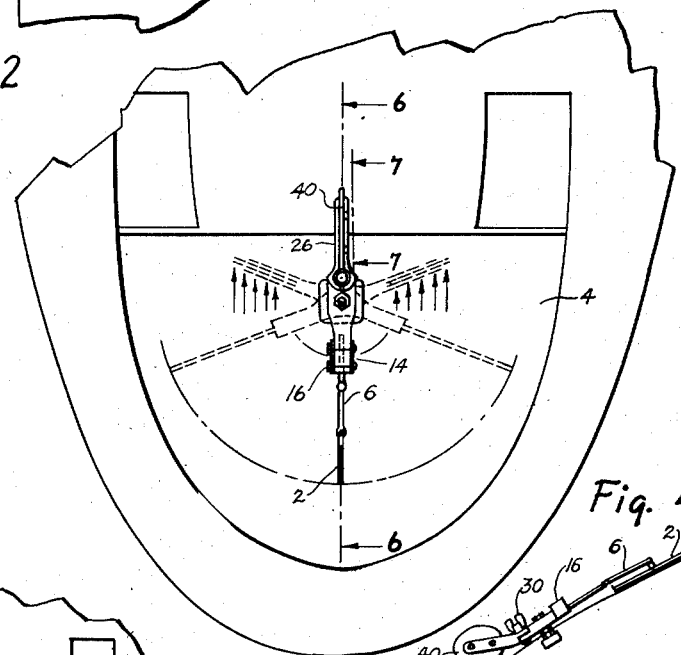
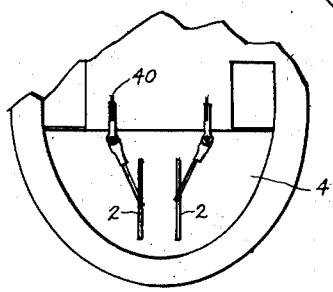
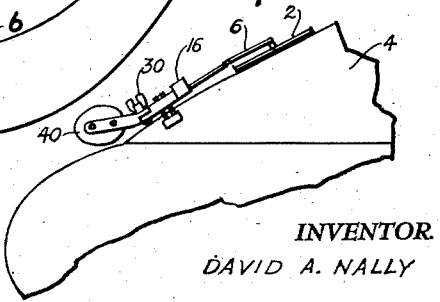
INVENTOR.
DAVID A. NALLY
BY Victor J. Evans & Co.
ATTORNEYS Jan. 1, 1952     D. A. NALLY     2,580,577
WINDSHIELD WIPER BALANCER
Filed Nov. 15, 1946     2 SHEETS—SHEET 2
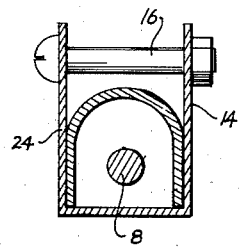
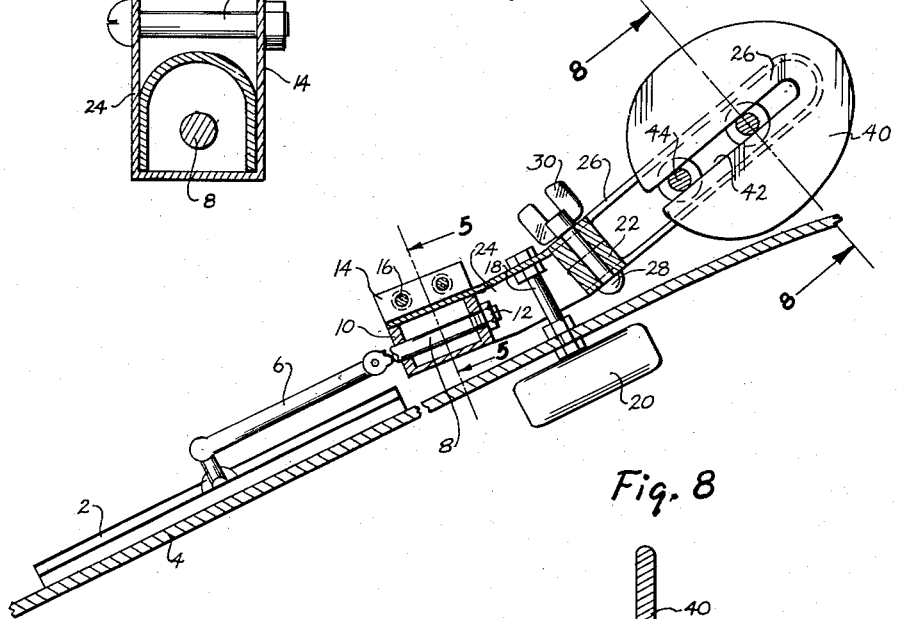
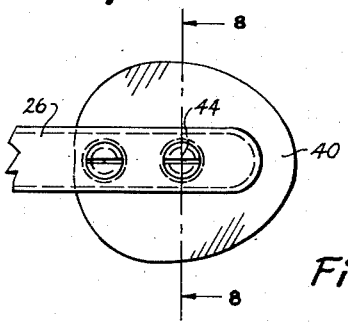
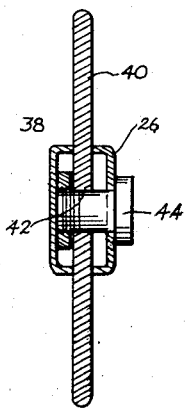
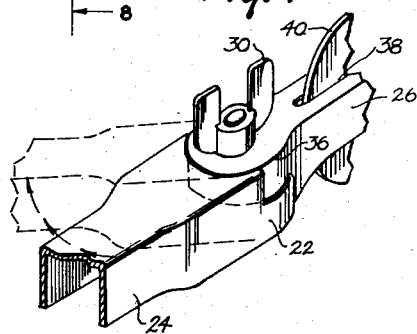
INVENTOR.
DAVID A. NALLY
BY *Victor J. Evans & Co.*
ATTORNEYS Patented Jan. 1, 1952

2,580,577

UNITED STATES PATENT OFFICE 2,580,577

WINDSHIELD WIPER BALANCER

David A. Nally, Downey, Calif.

Application November 15, 1946, Serial No. 709,977

3 Claims. (Cl. 15—255)

My present invention relates to an improved windshield wiper balancer and more particularly to a means of offsetting wind or air pressure on a wiper blade especially when used on airplanes. It has been found that airplanes in flight creating air flow currents, encounter difficulty in maintaining windshield wiper blades operative due to air pressure on the blades.

It is my primary purpose to provide a stabilizer or balance for such wiper blades so the wind pressure will be equalized on the blade resulting in more efficient operation.

In the accompanying drawings I have illustrated one complete example of the physical embodiment of my invention according to the best mode I have thus far devised, but it will be understood that various changes and alterations may be made in the exemplified structure within the scope of the appended claims.

In the drawings:

Fig. 1 is a side elevational view of a windshield wiper mechanism including the balancer of my invention.

Fig. 2 is a top plan view.

Fig. 3 is a top plan view of a dual wiper.

Fig. 4 is a side elevational view of a wiper mechanism in reversed position.

Fig. 5 is a sectional view at line 5—5 of Fig. 1.

Fig. 6 is a sectional view at line 6—6 of Fig. 2.

Fig. 7 is a plan view of the balancer or stabilizer.

Fig. 8 is a sectional view at line 8—8 of Fig. 6.

Fig. 9 is a perspective view of the adjustable connection for the stabilizer.

Referring now to the drawings, I utilize the conventional wiper blade 2 operable over the glass housing 4 and secured by link 6 which connects with the wiper arm 8 through partitions 10 and secured by nut 12 and supported by yoke 14 and bolts 16.

The arm 8 is mounted on shaft 18 which is driven by suitable motor 20. On the rear shoulder 22 of the arm 8 I mount an extension 24 having extension 26 secured by bolt 28 and wing nut 30, the recess formed in the shoulder 22 having a curved wall for co-action with the rounded portion 36 of the extension 26.

The extension is split at 38 to receive the plate 40 or stabilizer which is slotted at 42 to adjustably engage the bolts 44.

The stabilizer may be adjusted longitudinally of the extension 26 and the extension may be pivoted radially with respect to the arm 8 to effect the desired balanced position so that wind pressure against the wiper blade will also bear against the plate or stabilizer to offset the resistance of the blade and enable the plate to oscillate. The adjustment of the extension 26 with relation to the arm 8 permits the extension to be moved at an angle to the arm to provide greater efficiency on some installations as seen in Figure 3. These installations require an angular adjustment to properly steady the windshield wiper blades at or near the center of the windshield when not in use. Such angular adjustment also eliminates air drag when stopped at the center of the windshield.

Thus as the blade reaches the outer extent of its arcuate movement the wind pressure would normally prevent the return of the blade but with the plate positioned diametrically of the blade and presenting the opposite face to the wind, the pressure will be balanced and the blade may oscillate.

Having thus fully described my invention what I claim as new and desire to secure by Letters Patent is:

1. A windshield wiper including means for offsetting wind pressure against the wiper blade, which comprises a wiper arm which is adapted to oscillate about a fixed axis and to extend away from the axis in one direction, a windshield wiper blade secured to said oscillating wiper arm and caused to oscillate on said windshield thereby, a motor for oscillating said wiper arm, a second arm secured to said wiper arm and extending away from the axis in the opposite direction, and a plate adapted to respond to wind pressure supported by said second arm, said plate having an area exposed to wind pressure sufficiently great so that wind pressure against said wiper blade is offset, thereby permitting said wiper blade to oscillate regardless of the wind pressure thereagainst.

2. The windshield wiper construction defined in claim 1, wherein said second arm is pivotally mounted with respect to said wiper arm so that said second arm and said plate carried thereby may be positioned at an angle with respect to said wiper arm and said wiper blade, thereby maintaining said wiper blade at the approximate center of a windshield on which the wiper is mounted.

3. The windshield wiper defined in claim 1, wherein said plate is longitudinally adjustable along said second arm, thereby permitting accurate balancing of wind pressures against said wiper blade and against said plate.

DAVID A. NALLY.

REFERENCES CITED

The following references are of record in the file of this patent:

UNITED STATES PATENTS

| Number | Name | Date |
|---|---|---|
| 1,461,087 | Fitz Gibbon | July 10, 1923 |

FOREIGN PATENTS

| Number | Country | Date |
|---|---|---|
| 402,189 | Great Britain | Nov. 30, 1933 |